US010818033B2

(12) United States Patent
Dassa et al.

(10) Patent No.: US 10,818,033 B2
(45) Date of Patent: Oct. 27, 2020

(54) COMPUTER VISION ON BROADCAST VIDEO

(71) Applicant: OATH INC., New York, NY (US)

(72) Inventors: Guy Dassa, New York, NY (US); Yale Song, New York, NY (US); Jeffrey Scholz, New York, NY (US); Joao Vitor Baldini Soares, New York, NY (US); Minho Lee, New York, NY (US)

(73) Assignee: OATH INC., New York, NY (US)

( * ) Notice: Subject to any disclaimer, the term of this patent is extended or adjusted under 35 U.S.C. 154(b) by 249 days.

(21) Appl. No.: 15/907,586

(22) Filed: Feb. 28, 2018

(65) Prior Publication Data
US 2019/0221001 A1    Jul. 18, 2019

Related U.S. Application Data

(60) Provisional application No. 62/619,045, filed on Jan. 18, 2018.

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00724* (2013.01); *G06N 3/08* (2013.01); *H04L 65/4076* (2013.01);
(Continued)

(58) Field of Classification Search
CPC .... G06F 3/0485; G06K 9/00724; G06N 3/08; G06T 2207/20081; G06T 2207/20132;
(Continued)

(56) References Cited

U.S. PATENT DOCUMENTS

| 9,138,652 B1* | 9/2015 | Thompson ......... H04N 21/2358 |
| 2004/0125877 A1* | 7/2004 | Chang ................ G06K 9/00335 |
| | | 375/240.28 |

(Continued)

OTHER PUBLICATIONS

Q. Ye, Q. Huang, S. Jiang, Y. Liu, and W. Gao, "Jersey Number Detection in Sports Video for Athlete Identification," Proc. SPIE, 2005. (Year: 2005).*

(Continued)

*Primary Examiner* — Ian L Lemieux
(74) *Attorney, Agent, or Firm* — James J. DeCarlo; Greenberg Traurig, LLP

(57) ABSTRACT

Disclosed are systems and methods for improving interactions with and between computers in content searching, hosting and/or providing systems supported by or configured with devices, servers and/or platforms. The disclosed systems and methods provide an image processing framework that sub-divides computer vision techniques into three computationally efficient steps: detection, classification and matching. These steps provide an improved image processing framework that can analyze live stream data of a media file, in real-time, in order to identify and track specific digital objects depicted therein. This enables not only image processing detection results, but also the capabilities of augmenting the video stream with additional data related to the detected object.

20 Claims, 8 Drawing Sheets

(51) Int. Cl.

| | |
|---|---|
| *G06N 3/08* | (2006.01) |
| *H04N 21/2187* | (2011.01) |
| *H04N 21/431* | (2011.01) |
| *H04L 29/08* | (2006.01) |
| *H04L 29/06* | (2006.01) |
| *H04N 21/44* | (2011.01) |
| *H04N 21/234* | (2011.01) |
| *G06F 3/0485* | (2013.01) |
| *H04N 21/4722* | (2011.01) |

(52) U.S. Cl.
CPC ............ *H04L 65/602* (2013.01); *H04L 65/80* (2013.01); *H04L 67/02* (2013.01); *H04N 21/2187* (2013.01); *H04N 21/23418* (2013.01); *H04N 21/4316* (2013.01); *H04N 21/44008* (2013.01); *G06F 3/0485* (2013.01); *G06T 2207/20081* (2013.01); *G06T 2207/20132* (2013.01); *G06T 2210/12* (2013.01); *G06T 2210/22* (2013.01); *H04L 65/1063* (2013.01); *H04L 65/4069* (2013.01); *H04N 21/4722* (2013.01)

(58) Field of Classification Search
CPC ... G06T 2210/12; G06T 2210/22; G06T 7/75; H04N 21/23418; H04N 21/44008
See application file for complete search history.

(56) References Cited

U.S. PATENT DOCUMENTS

| | | | | | |
|---|---|---|---|---|---|
| 2010/0134614 | A1* | 6/2010 | Aman | ................ | A63B 24/0003 348/135 |
| 2011/0169959 | A1* | 7/2011 | DeAngelis | ......... | A63B 24/0021 348/157 |
| 2012/0114233 | A1* | 5/2012 | Gunatilake | ........ | G06K 9/00744 382/165 |
| 2015/0169960 | A1* | 6/2015 | Laksono | .............. | G06K 9/4652 382/170 |
| 2016/0292510 | A1* | 10/2016 | Han | .................... | G06K 9/00724 |
| 2018/0020243 | A1* | 1/2018 | Ni | ...................... | H04N 21/2187 |
| 2018/0032858 | A1* | 2/2018 | Lucey | ...................... | G06N 3/04 |
| 2018/0084310 | A1* | 3/2018 | Katz | ...................... | G06F 16/783 |
| 2019/0087661 | A1* | 3/2019 | Lee | ........................... | G06T 7/11 |

OTHER PUBLICATIONS

European Search Report to corresponding EP Application No. 19152571.6 dated Jun. 17, 2019 (10 pages).

Gan et al., "You Lead, We Exceed: Labor-Free Video Concept Learning by Jointly Exploiting Web Videos and Images," 2016 IEEE Conference on Computer Vision and Pattern Recognition (CVPR), IEEE, pp. 923-932 (2016).

Gan et al., "Webly-supervised video recognition by mutually voting for relevant web images and web video frames," Serious Games, vol. 9907 (2016).

Kumar et al., "Track and Transfer: Watching Videos to Simulate Strong Human Supervision for Weakly-Supervised Object Detection," 2016 IEEE Conference on Computer Vision and Pattern Recognition (CVPR), IEEE, pp. 3548-3556 (2016).

Su et al., "Transfer Learning for Video Recognition with Scarce Training Data for Deep Convolutional Neural Network," pp. 1-12 (2015).

Hong et al., "Weakly Supervised Semantic Segmentation using Web-Crawled Videos," Arxiv. Org, Cornell University Library (2017).

* cited by examiner

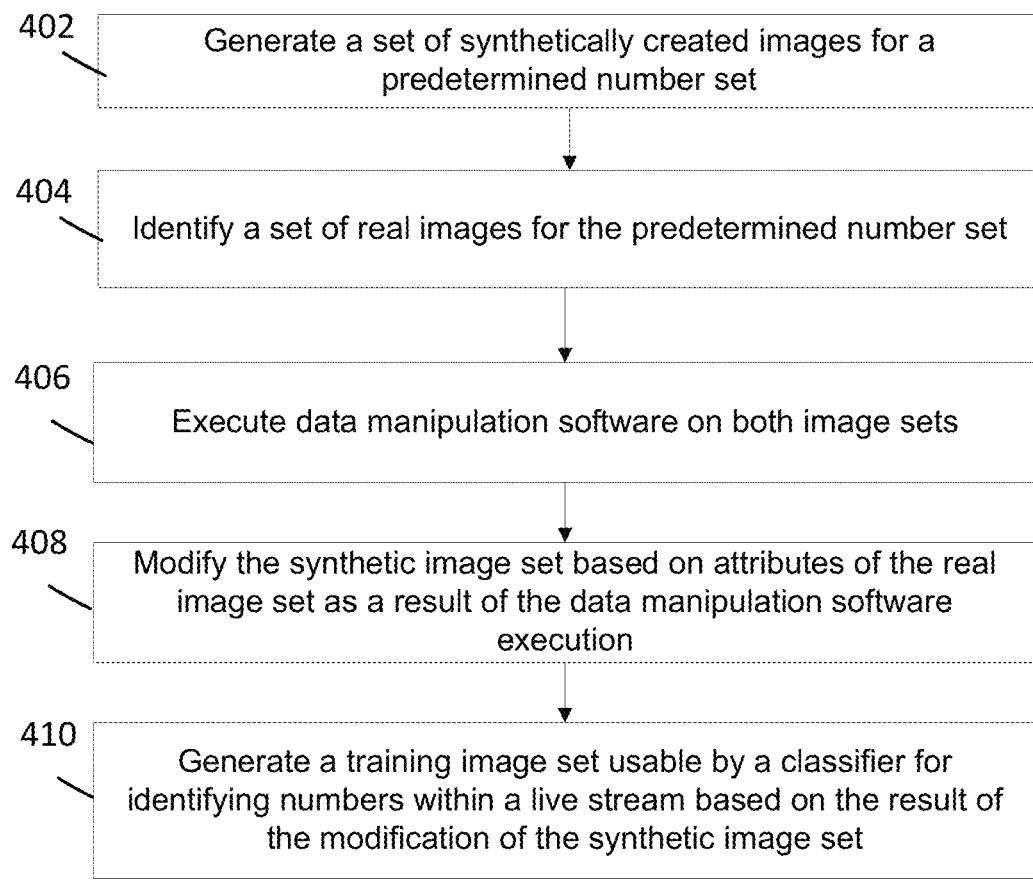

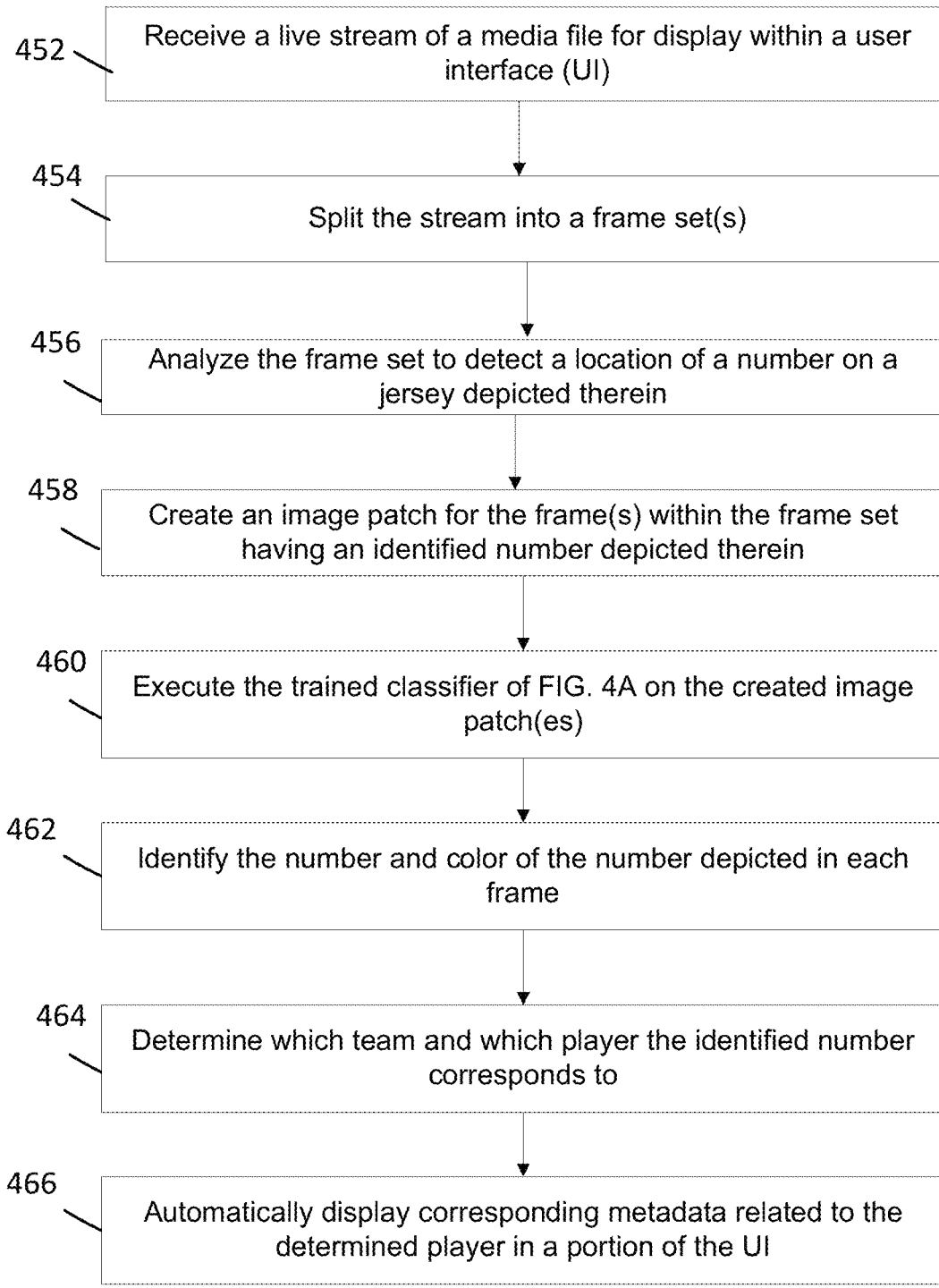

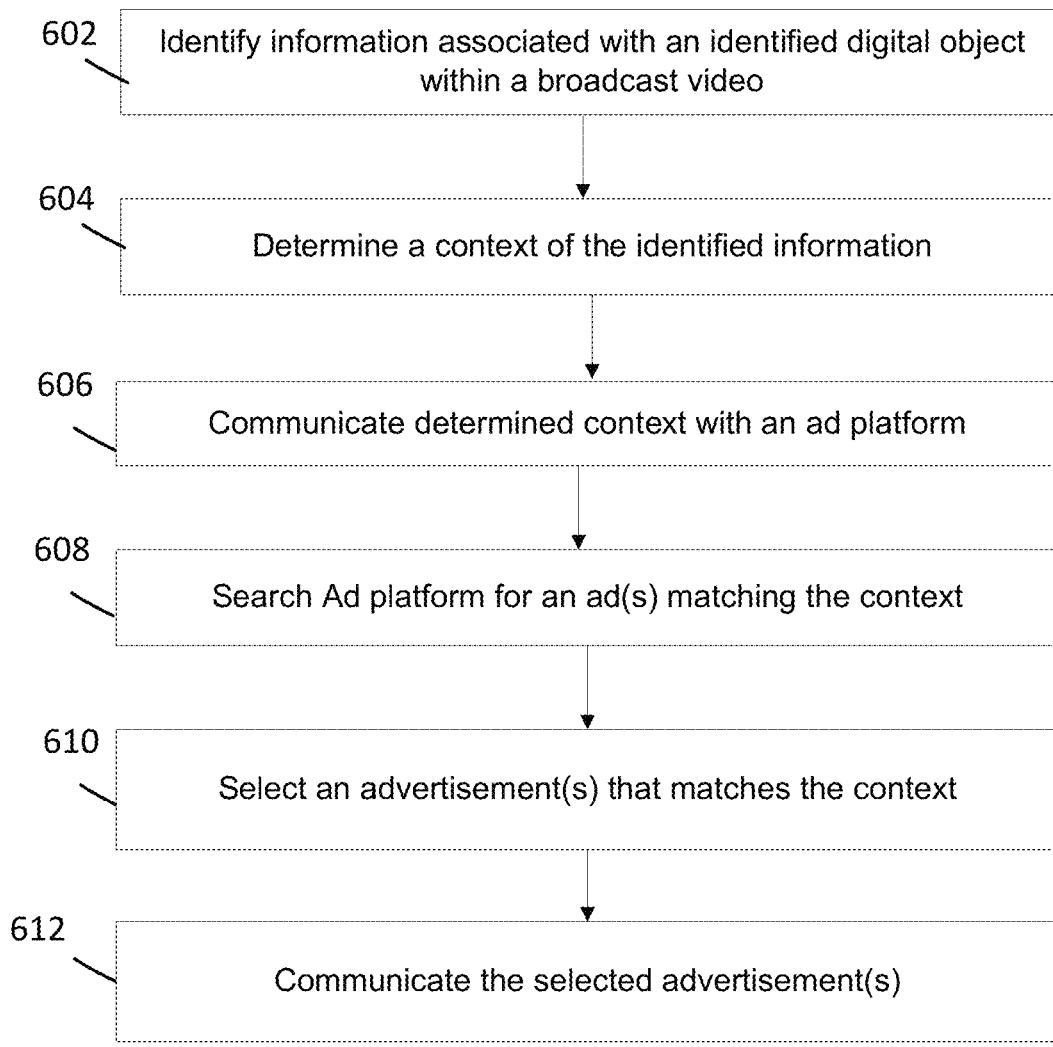

COMPUTER VISION ON BROADCAST VIDEO

CROSS-REFERENCE TO RELATED APPLICATION

This instant application claims the benefit of priority from U.S. Provisional Application No. 62/619,045, filed on Jan. 18, 2018, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms for a novel and improved image processing framework for identification of specific digital objects/elements displayed during a live stream of a video broadcast.

BACKGROUND

Currently, there are many systems and methods that have been developed for identifying and defining objects in video, and for tracking their movement throughout the frames of the video. Most conventional systems implement computer vision or machine learning (or artificial intelligence (AI)) technologies to perform such tracking. However, real-time or near-real-time computer vision processing takes significantly more computing power than is typically available in most existing platforms and using such methodologies, especially for mobile and embedded applications, can lead to a number of technological challenges when processing real-world environments depicted in live-video streams, e.g. HLS (HTTP Live Streaming) streams.

For example, depicted real-world environments are often very busy, noisy and dynamic, and the processing required to detect, identify and track objects within such scenes often leads to inaccurate results, and exhausts the limited processing resources allocated to the systems providing and analyzing the live-stream. Most devices and/or platforms performing such computer vision techniques have limited processing power (e.g., smartphones), and due to the significant amount of manual post-processing required to identify, detect, extract and track objects within video, conventional image processing techniques are inefficient, not user-friendly, or simply incapable of functioning to meet application demands. Additionally, to compound these problems, most open-source computer vision libraries are either too complex or inefficient to be used by most application developers. Therefore, this leads to no easy-to-use, integrated solution for implementing real-time computer vision technology—especially for object recognition and reconstruction within live video.

SUMMARY

The disclosed systems and methods provide a technical solution to existing technical problems, especially those highlighted above, by providing an improved image processing framework for real-time or near-real-time identification of specific digital objects/elements displayed during a live stream of a video broadcast. The disclosed systems and methods provide advanced mechanisms that i) reduce the processing power required to perform such image processing, thereby enabling even the most modestly configured devices with the capability to perform the disclosed image processing; and ii) eliminate the need for vast storage processing as frames are analyzed in real-time. Further, the need for annotations, and human involvement and intervention is removed, which leads to increased processing speeds and improved efficiency in how the disclosed system processes live-streams in real-time.

As evidenced from the disclosure herein, when a video broadcast (e.g., an HLS live stream) is transmitted and received by a processing device, the disclosed systems and methods take a novel approach by sub-dividing the processing task into three sub-tasks: detection, classification and matching based on the characteristics and features identified within the frames of the stream. This reformulation of typical processing approaches significantly reduces the number of object categories that need to be recognized in order to accurately track the object.

For example, there are about 1600 players in the NFL, from 32 teams, and each team has about 50 players on their roster. Using conventional approaches, visual recognition of each player in video poses a significant challenge because their "visual identity" (i.e., the back numbers from athletic jerseys) have a variety of different fonts, shapes, colors, angles, wrinkles and other distortions that result from different lighting conditions in the video. Therefore, instead of having to analyze the jerseys from the perspective of 1600 players, the improved framework discussed herein reduces this to two smaller analysis steps: classification into 100 categories (assuming there are 100 different jersey numbers—i.e., 0 to 99) and jersey color classification into a small number of colors, as required to determine one of the 32 teams. By splitting the problem into two steps, the process of creating the image processing models via training (in a training stage that comes before applying them to video broadcasts) is significantly simplified, as follows. Instead of having to create a very large training dataset to represent jersey appearances for 1600 players, we instead create two smaller datasets, one to represent the 100 different jersey numbers, and one to represent the tens of colors that will correspond to the 32 teams. Therefore, this evidences an improvement in processing efficiency and preservation of CPU resources evidenced through a ratio of the accuracy of the training to the required steps to implement the trained model: increased accuracy of the applied training model leads to reduced processing cycles for determining an accurate result.

Additionally, the disclosed systems and methods eliminate the need for manual training steps that involve labeling and augmenting objects/frames within a video. Rather, the disclosed systems and methods first synthetically generate training images, where such training images provide a significantly large number and in some cases almost every possible variation of the objects attempting to be detected—for example, all permutations of different numbers, fonts, colors, light distortions and orientations that jersey numbers may appear in. Therefore, instead of having to perform the potentially inaccurate and resource-reliant manual annotation of existing data, the disclosed framework generates its own synthetic data that leads to more accurate results, as the generated data is manipulated at the pixel-level (and in some embodiments, at the key-frame level) to appear as if they are in fact the objects of interest (e.g. real athletic jersey images). This automatic process leads to an easier-to-use/ implement and more efficient comparative training set that significantly reduces the time required to train a classifier. Thus, having the more accurately and efficiently trained model, the implementation of such trained model leads to an efficient result, as the classifications of detected objects is based upon a more accurate training set, which reduces the number of computational cycles required for performing the classification (e.g., an accurate training set leads to an efficient result when applying the training set).

For purposes of this disclosure, live-streamed video will be referenced with respect to a live-broadcast of a sporting event (e.g., a football game), and the identified, detected and tracked objects will be discussed with reference to a player, specifically, the player's jersey number. While the disclosure herein will focus on this specific embodiment as one example, it should not be construed as limiting, as any type of object and/or form of video or content present therein can be analyzed and processed according to the disclosed systems and methods. For example, detection of a specific product within a commercial can be performed in the like manner of jersey number detection within a sporting event, as discussed in detail herein.

In accordance with one or more embodiments, the instant disclosure provides computerized methods for executing the image processing framework discussed herein, as well as a non-transitory computer-readable storage medium for carrying out the above mentioned technical steps of the image processing framework. The non-transitory computer-readable storage medium has tangibly stored thereon, or tangibly encoded thereon, computer readable instructions that when executed by a device (e.g., content server, client device, and the like) cause at least one processor to perform a method for a novel and improved framework for real-time identification of specific digital objects/elements displayed during a live stream of a video broadcast.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4A is a flowchart illustrating steps performed for training the video intelligence engine in accordance with some embodiments of the present disclosure;

FIG. 4B is a flowchart illustrating steps performed for applying a trained video intelligence engine in accordance with some embodiments of the present disclosure;

FIG. 6 is a flowchart illustrating steps performed in accordance with some embodiments of the present disclosure.

DESCRIPTION OF EMBODIMENTS

Figure 1:
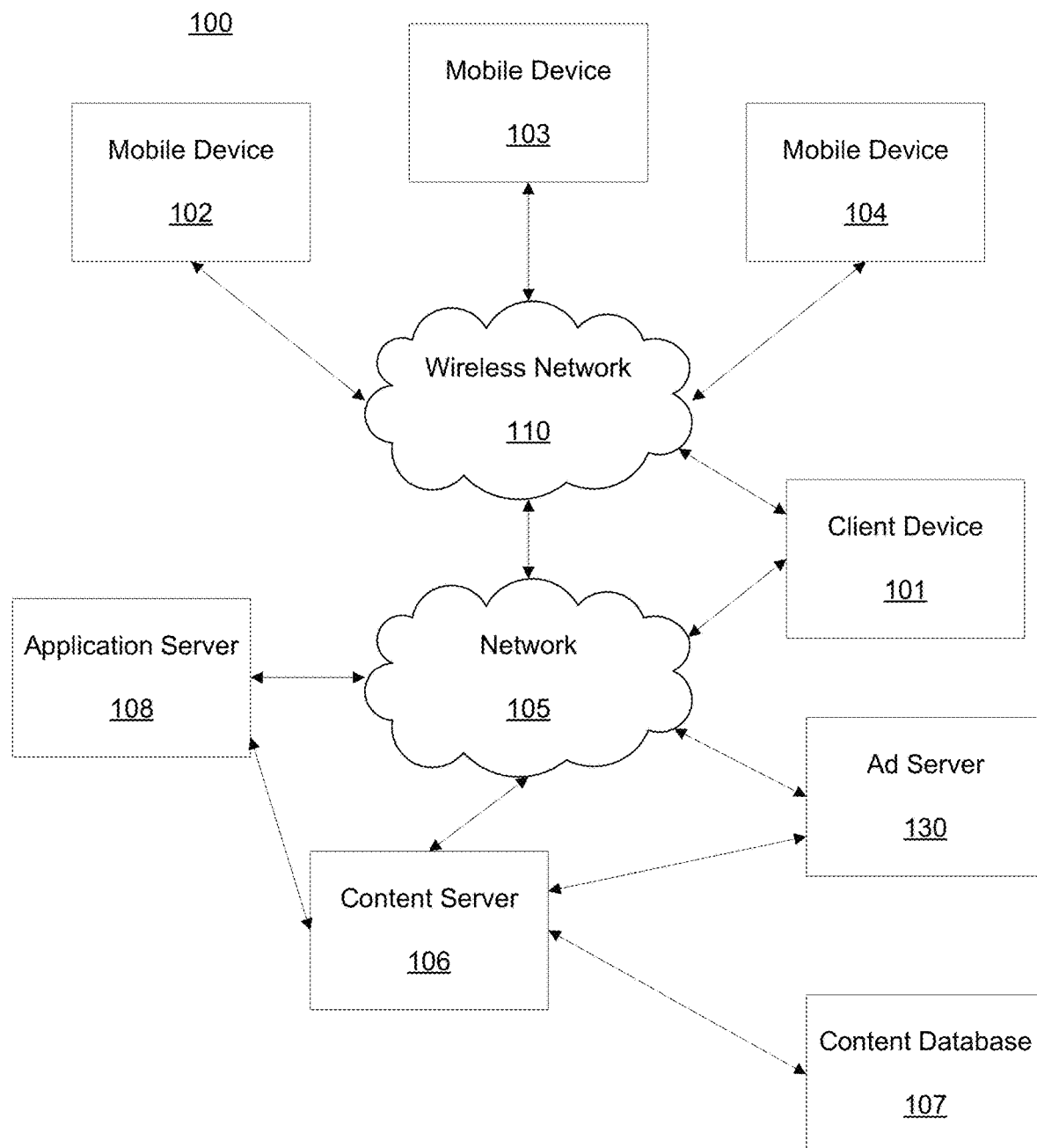
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet can be a client device. In another example, a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as live broadcasts of professional sporting events). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide a novel framework for identification of specific digital objects/elements displayed during a live stream of a video broadcast. In some embodiments, the disclosed systems and methods can be performed in real-time. As used herein real-time or near-real-time are intended to confer similar concepts and generally, unless a different definition is derived from a specific context, and as recognized by a person of skill, real-time is intended to convey that the processes disclosed herein occur as the live video stream is being received and are subject to network and/or system latency, thus no particular time or delay is intended to be reflected by real-time, but rather, as understood by a person of skill, real-time has differing time scopes in differing applications. The disclosed systems and methods provide improved mechanisms for implementing computer vision techniques on a live video stream (referred to as a "live stream," interchangeably). Conventional approaches for identifying athletes (i.e., their specific digital representations within live streams) relied upon pre-established approaches involving facial recognition and field location. However, as discussed above, not only are these approaches computationally deficient, they were limited in their effectiveness when applied to live streams.

For example, with regard to facial recognition or detection, the technological drawbacks are evident in how conventional systems produced inaccurate results, as they are hindered by the players' uniforms (e.g., helmets, hats, and the like) which obstruct their facial features. Athlete field location, although helpful, is hampered by the standard practice of players changing locations between the bench and the playing field over the course of game-play.

Additionally, in order for such systems to employ such object detection models at scale, there is a requirement for the manual labeling of training data which results in costly and time-consuming efforts, both from the human editor perspective as well as from the device implementation standpoint. For example, computer vision techniques are computationally expensive and require processing faster than 30 frames per second (fps). Therefore, when dealing with live stream data, the time frame for collecting and processing the stream is limited due to the real-time nature of the stream.

The instant disclosure provides remedies to these shortcomings by automating the labeling and detection processes performed by devices when rendering real-time video streams. Since there is currently no system that can efficiently and effectively process such real-time data, this alone evidences advancements, via the present disclosure, in the ways live streams are processed. According to some embodiments, the disclosed automation is based on identification, detection and tracking of athlete jersey numbers, as they are constantly and prominently displayed, thereby allowing the disclosed systems and methods to localize and classify them while relying on minimal training data. For example, in the application of live American football or baseball (e.g., NFL® games or MLB® games), soccer, hockey, or any other game in which numbered (or even named) jerseys are worn for example, recognition, number (or name or other identifier) localization and classification techniques discussed herein provide an improved, streamlined, device and network resource independent approach that results in increased speed and accuracy in ways devices identify players of games.

Figure 5A:
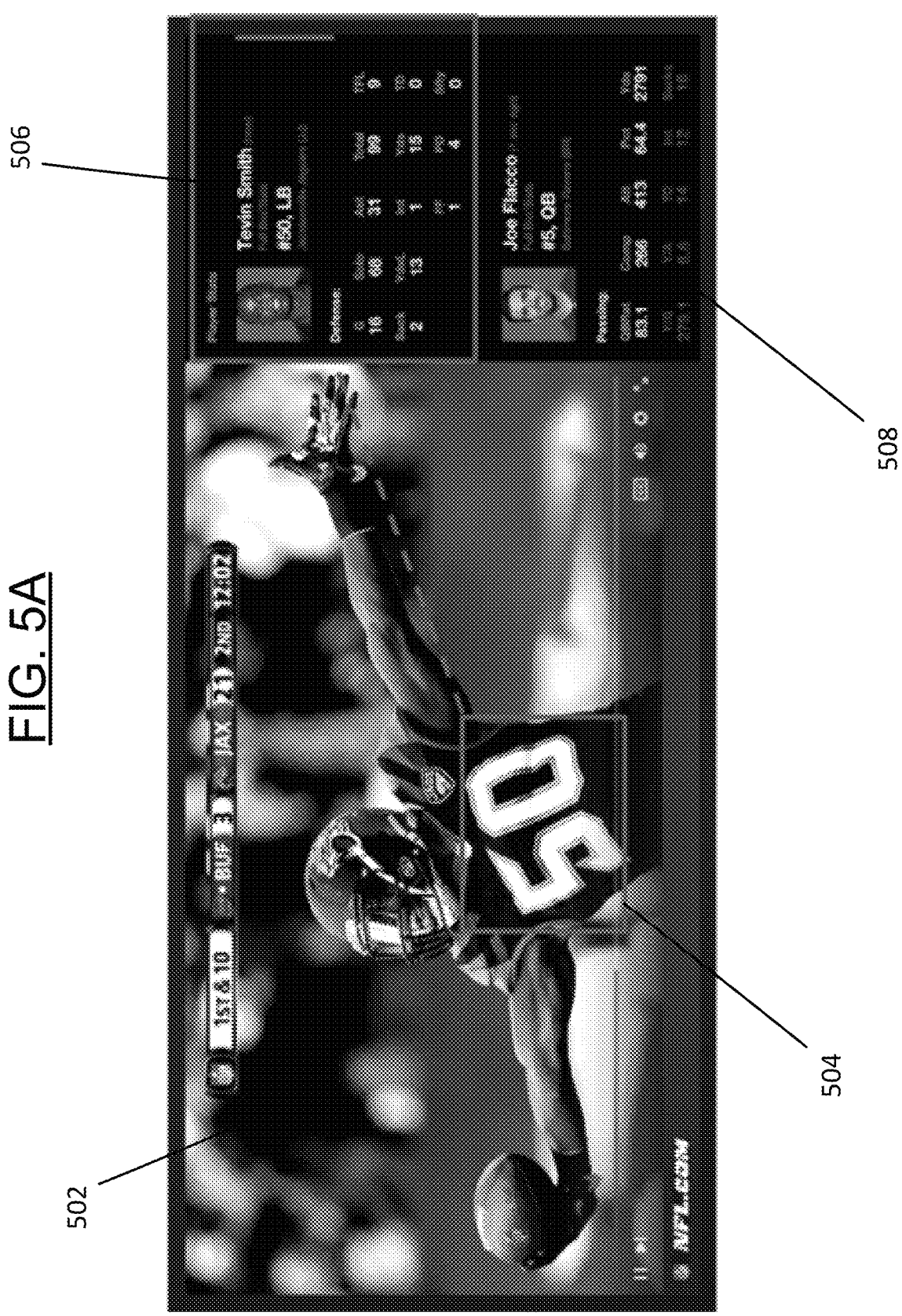
FIGS. 5A-5B illustrate non-limiting embodiments of the real-time detection of a digital object within an HLS live stream according to some embodiments of the present disclosure.

According to some embodiments of the instant disclosure, the disclosed systems and methods provide a computer vision system that identifies athletes during live game streams (or feeds), and is configured to provide metadata for identified players in real time. For example, as illustrated in FIG. 5A, and discussed in more detail below, during a game between Buffalo and Jacksonville, player #50 is identified and tracked during the streaming of game, and the metadata 506 is provided, which supplements the viewing experience for a user.

In some embodiments, the disclosed framework can implement trained network models for classification, such as for example deep neural network techniques for identifying and locating jersey numbers on jerseys worn by players appearing in a video frame. Such deep net techniques can involve any known or to be known deep learning architecture or algorithm, such as, but not limited to, deep neural networks (DNNs), artificial neural networks (ANNs), convolutional neural networks (CNNs), deep belief networks and the like.

For example, the visual intelligence engine 300, as discussed in more detail below, can employ CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, ReLU (rectified linear unit) layer, pooling layer, dropout layer and loss layer, as understood by those of skill in the art. When used for image recognition, CNNs produce multiple tiers of deep feature collections by analyzing small portions of an input image.

For purposes of this disclosure, such features/descriptors can include, but are not limited to, visual characteristics of the images characterized (or categorized and labeled) by color features, texture features, type features, edge features and/or shape features, and the like. The results of these collections are then tiled so that they overlap to obtain a better representation of the original image; which is repeated for every CNN layer. CNNs may include local or global pooling layers, which combine the outputs of feature clusters.

It should be understood by those of skill in the art that the features/attributes (or descriptors or deep descriptors) of the input (e.g., video stream) can include any type of information contained in, or associated therewith, image data, video data, audio data, multimedia data, metadata, or any other known or to be known content that can be associated with, derived from or comprised within the input file.

Therefore, according to embodiments of the instant disclosure, rather than performing the detection and identification of objects from a stream at the same time, as in conventional systems, the disclosed systems and methods perform computer vision image processing of a live stream of a video broadcast by splitting the processing into three (3) sub-tasks: athletic jersey detection, jersey number classification and team-player matching based on jersey characteristics and numbers. Through the deep net analysis performed by the visual intelligence engine 300, and its disclosed modules 302-308, as discussed in more detail below, the disclosed systems and methods are capable of distinguishing between extraneous numbers, such as field and yard marks, and player numbers. By using jersey numbers, their color information and information indicating which two teams are playing, along with each team's roster, the disclosed systems and methods are capable of identifying specific players based solely on the identification of numbers and their colors within a video frame. As evidenced from the discussion herein, such implementation results in a reduced reliance on computational resources, the significant reduction on human interaction, and increased speed and precision in which specific players are identified during a live broadcast of a game.

The improved image processing framework discussed herein can render and analyze the video in any format that is either known or to be known. For purposes of this disclosure, the discussion herein uses as an example HTTP Live Streaming (also known as "HLS") for live-streaming media and MPEG-4 Part 14 (or MP4) for archived or on-demand video; however, any type of known or to be known format of video wherein individual video frames can be identified and analyzed as disclosed herein can be utilized without departing from the scope of the instant disclosure.

As understood by those of skill in the art, HLS is an HTTP-based media streaming communications protocol. HLS communications involve breaking the overall stream into a sequence of small HTTP-based file downloads, where each download loads one short portion of an overall potentially unbounded transport stream. As the stream is played, a number of different alternate streams containing the same material encoded at a variety of data rates can be selected, thereby allowing the streaming session to adapt to the available data rate (or bandwidth). At the start of the streaming session, an extended M3U playlist is downloaded to the client (or receiving device), where the playlist contains the metadata for the various sub-streams which are available.

HLS communication protocol, or streaming of media in HLS format, uses a web server to distribute audio-visual content and requires specific software to fit into the proper format transmission in real time. The service architecture comprises a server, distributor and a client. As discussed below, the server and distributor can take the form of any server discussed below in reference to FIG. 1 below. The client can take the form of any client, or client device discussed in reference to FIGS. 1-2 below.

As understood by those of skill in the art, the server can encode and/or encapsulate the input video flow in a proper format for the delivery. Then, the video is prepared for distribution by segmenting it into different files. In the process of intake, the video is coded and segmented to generate video fragments and index file (e.g., playlist). The server performs this by utilizing an encoder that encodes video files in H.264 format and audio in MP3, HE-AAC or AC-3. This is encapsulated by MPEG-2 Transport Stream (TS) to carry the coded and segmented video. The server then implements a segmenter that divides the MPEG-2 TS file into fragments and identified with a .ts file suffix. The server also creates an index file (e.g., playlist) that contains references of the fragmented files, saved as an .m3u8 file.

The distributor utilized within the service architecture of HLS protocol can take the form of a web server—e.g., any type of server, as discussed in reference to FIG. 1, as it accepts requests from clients and delivers the resources needed for streaming. The client requests and downloads all the files and resources, assembles them so that they can be presented to the user as a continuous flow of video. The client software first downloads the index file through a uniform resource locator (URL), and then the .ts media file segments identified in the index file sequentially. The client further includes playback software that assembles the sequence to allow continued display to the user regardless of the variable playback data rates.

As discussed in more detail below at least in relation to FIG. 6, according to some embodiments, information associated with, derived from, or otherwise identified from, during or as a result of image processing of a live-stream, as discussed herein, can be used for monetization purposes and targeted advertising when providing, delivering or enabling such devices access to content over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG.

1 additionally includes a variety of servers, such as content server 106, application (or "App") server 108 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Thus, client device 101 may also have differing capabilities for displaying navigable views of information.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., Netflix®, Hulu®, iTunes®, Amazon Prime®, HBO Go®, and the like), for example, can be hosted by the application server 108 (or content server 106 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
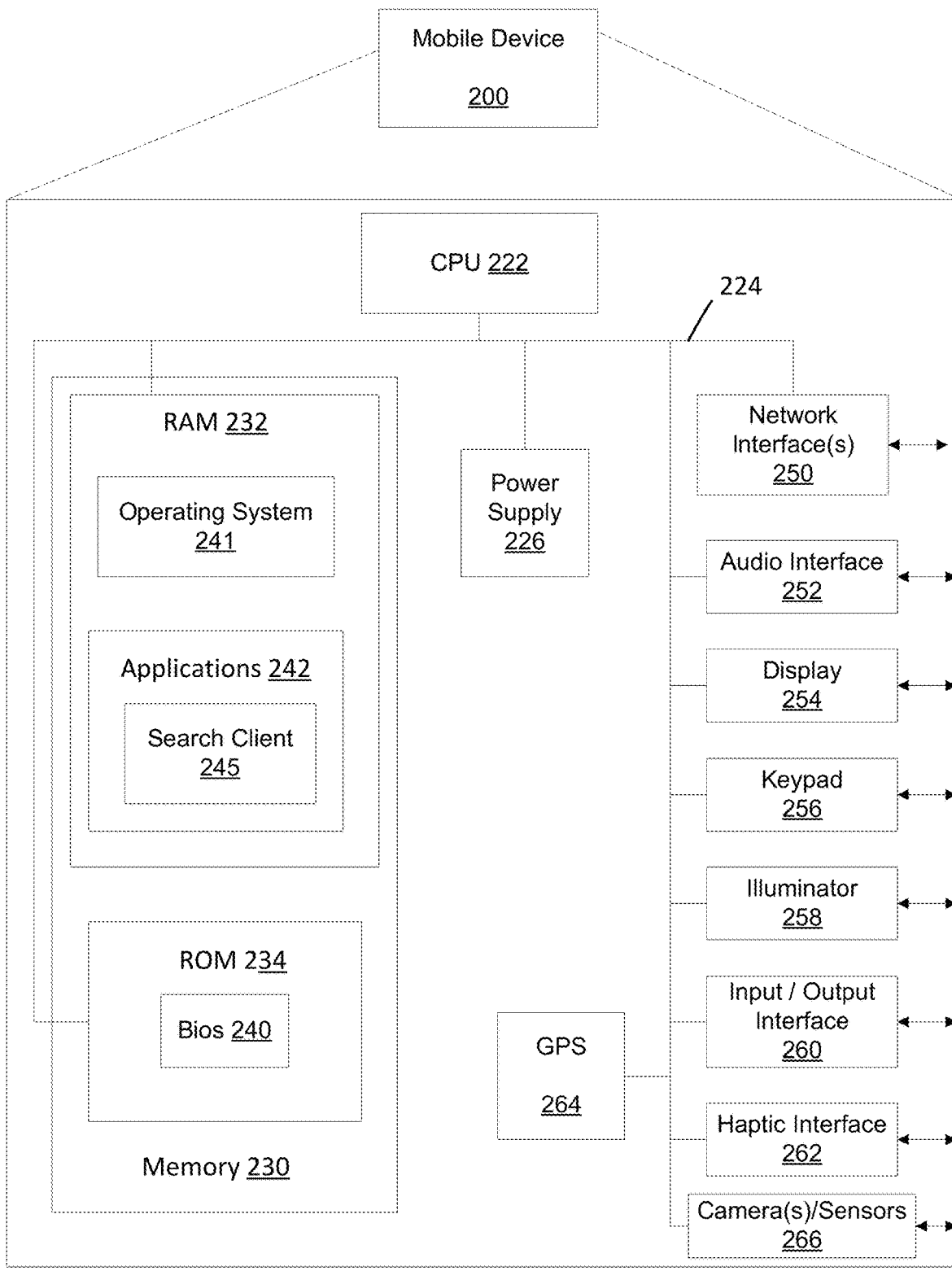
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
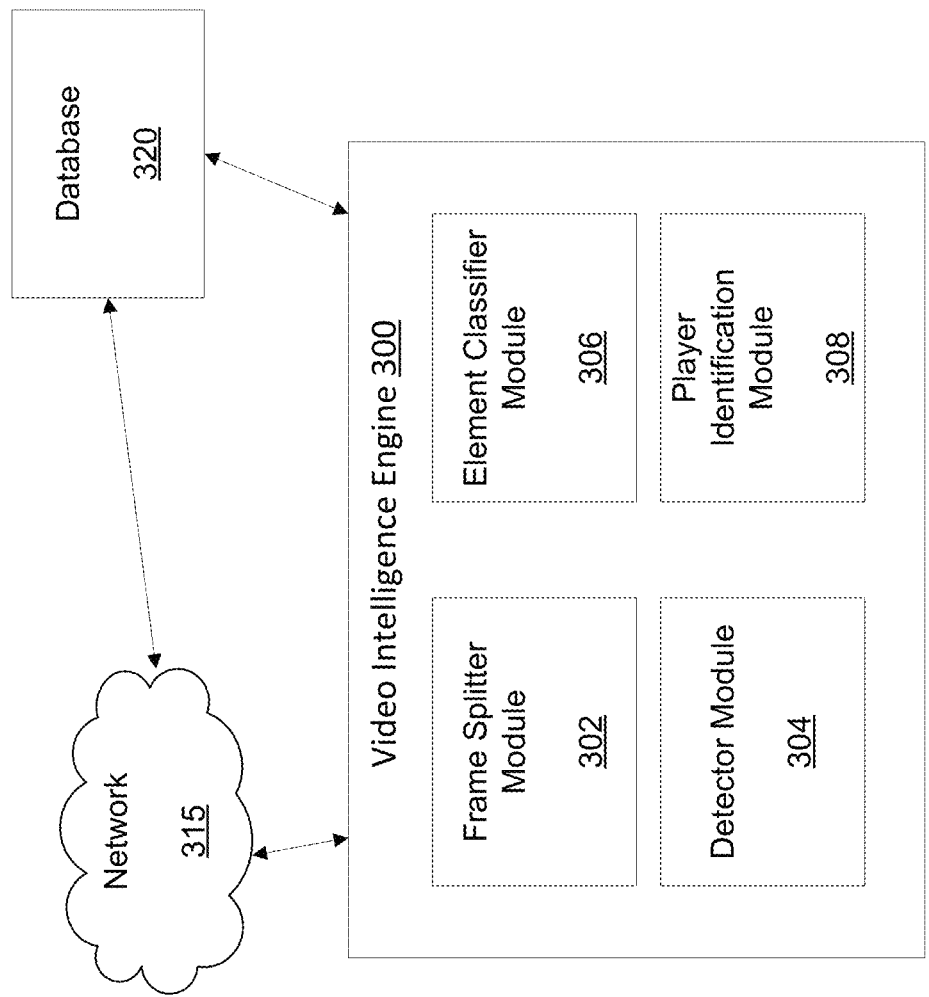
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a video intelligence engine 300, network 315 and database 320. The video intelligence engine 300 can be a special purpose machine or processor and could be hosted by an application server, content server, social networking server, web server, search server, content provider, third party server, user's computing device, and the like, or any combination thereof.

According to some embodiments, video intelligence engine 300 can be embodied as a stand-alone application that executes on a user device. In some embodiments, the video intelligence engine 300 can function as an application installed on the user's device, and in some embodiments, such application can be a web-based application accessed by the user device over a network. In some embodiments, the video intelligence engine 300 can be installed as an augmenting script, program or application (e.g., a plug-in or extension) to another media content hosting/serving application (e.g., Yahoo! Sports®, Yahoo! Video®, NFL® Video, NHL® Video, MLB® Video, Hulu®, YouTube®, Verizon® Video, and the like).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of creating, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media and/or service providers and/or platforms. For example, the information can be related to, but not limited to, content type of the video, a category associated with the video, information associated with the pixels and frames of the videos, information associated with the provider of the video, information associated with the players involved in the video, information associated with the activity being depicted in the video, and any other type of known or to be known attribute or feature associated with a video file, or some combination thereof. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Verizon®), by the content/service providers providing video content (e.g., Verizon®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received or analyzed, it can be stored in database 320 as a n-dimensional vector (or feature vector) representation for each video and/or for each frame of the video, where the information associated with the video can be translated as a node on the n-dimensional vector. In some embodiments, as digital objects within a video are identified, detected and/or tracked, information corresponding thereto can also be stored in the database 320 in a similar manner. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of streaming video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., streaming, downloadable or on-demand videos), other forms of user generated content and associated information, including for example text, audio, multimedia, RSS feed information can be used without departing from the scope of the instant application, which can thereby be communicated and/or accessed and processed by the video intelligence engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the video intelligence engine 300, and the database of stored resources 320. Indeed, as illustrated in FIG. 3, the video intelligence engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as video intelligence engine 300, and includes frame splitter module 302, detector module 304, element classifier module 306 and player identification module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIGS. 4A-4B, Processes 400 and 450 detail steps performed in accordance with some embodiments of the present disclosure for building and implementing an image processing, computer vision framework for real-time identification of specific digital objects/elements displayed during a live stream of a video broadcast. Process 400 of FIG. 4A details the steps of building and training the framework, and Process 450 of FIG. 4B details the steps of applying such framework to a live-stream video broadcast in real-time (i.e., as the video broadcast is streamed over a network and rendered on a computing device (e.g., a user's mobile device)).

Turning first to Process 400 of FIG. 4A, the video intelligence engine 300 is trained to be provided with functionality for identifying specific elements within a live stream. For purposes of this disclosure, the elements that will be discussed are jersey numbers worn on the jerseys of players depicted within displayed frames of the live stream, however, it should not be construed as limiting, as the video intelligence engine 300 can be trained and applied in order to identify any type of data object or item depicted within any type of rendered video.

According to embodiments of the instant disclosure, Steps 402-410 of Process 400 are performed by the element classifier module 306 of the video intelligence engine 300.

According to some embodiments, the element classifier module 306 can apply a trained network model such as a neural network, technique or algorithm—for example, a CNN, as discussed above. However, conventional applications of a CNN require large amounts of training images to produce a viable result. For example, within standard benchmarks containing 1,000 visual categories, state-of-the art CNN models require at least 1.2 million images to successfully train a classifier. Essentially, this means that a classifier would need around 120K annotated images of 100 different types. Annotating thousands of images is not only time-consuming and quite costly, it also involves significant reliance on computing processing power, thereby reducing the efficiency of a system implementing this existing technique. Additionally, this would result in a significant delay in the "time-to-market" for such system. These all present major hurdles for practical applications.

To address this, the element classifier module 306 of video intelligence engine 300 provides an advanced solution that automatically creates a large number of annotated images, thereby removing the reliance on the ImageNet dataset typically relied upon during training.

Additionally, such creation is performed locally, thereby removing any costs that are associated with access to proprietary training datasets. As discussed herein, Process 400 details the steps of generating a synthetically created image dataset of jersey numbers depicted on uniforms that accounts for the abnormalities that may exist on jersey depictions within a video—for example, jersey numbers that may have different fonts, shapes, colors, display angles, wrinkles, and any other type of distortion that may be displayed therein (e.g., dirt on the jersey covering at least part of the number, or different lighting conditions from particular weather patterns or if the game is played indoors versus outdoors).

Process 400 begins with Step 402 where a set of synthetically created images for a predetermined number set is created. For example, for a set of jersey numbers, the predetermined number set could include numbers from 0 to 99. This would therefore involve 100 classes of images. In some embodiments, this could include generating 1,000 examples for each class, which would result in 100,000 generated images. Considering 100,000 versus the state-of-the-art 1.2 million images, this evidences an improvement in efficiency, as evident from the discussion herein.

Figure 5B:
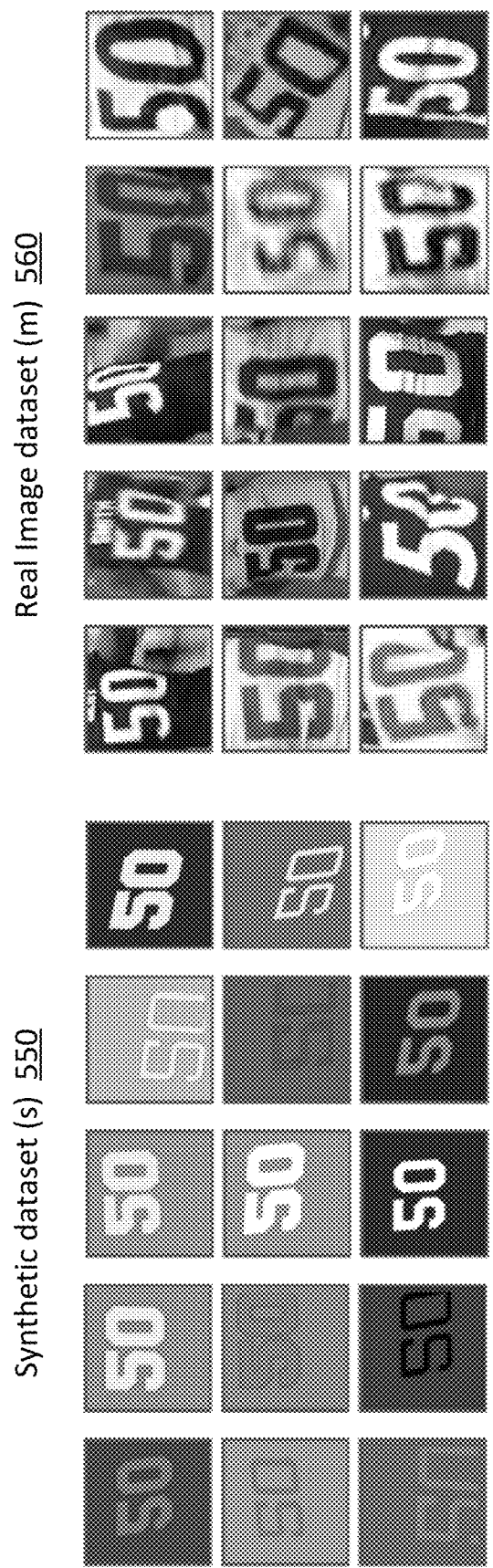

By way of non-limiting example, referencing FIG. 5B, the generated synthetic image dataset (s), item 550, illustrates a subset of images created for the number 50 displayed on different jersey environments. The coloring, size and font of the numbers, as well as the coloring and shades of the jerseys depicted in item 550 provides an example of a synthetically generated dataset.

Process 400 proceeds to Step 404 where a set of real images for the predetermined number set are identified. As above, the predetermined data set in the example embodiment discussed herein is 0-99. Therefore, the real images display training examples of numbers 0-99 depicted on jerseys. In some embodiments, these images can be sample images captured from previous game play that depict numbers 0-99. As depicted in FIG. 5B, the real dataset (m) is displayed as item 560.

In Step 406, the video intelligence engine 300 executes data manipulation software, such as CycleGAN or any other type of known or to be known algorithm or modelling technique that maps features of source images to target images without paired training data.

For example, as understood by those of skill in the art, CycleGAN configured software can take unpaired images of objects that look similar to each other from two distinct datasets or domains (here, for example, the dataset (s) and the dataset (m), as discussed above). The images from the two datasets are unpaired in the sense that the source and target images are not require to be paired, i.e. each source image need not be associated to any particular target image. CycleGAN software then trains a generative adversarial network (GAN) with a "cycle consistency" constraint that involves: when transforming a randomly sampled image patch from an image of one dataset and then transforming it back again to the original dataset, that patch must looks as if it is part of an image patch from the original dataset—hence the "cycle consistency." This methodology involves checking this consistency by comparing distributions of image patches, not the individual image patches. Thus, CycleGAN is capable of transforming an image of one dataset (e.g., dataset (s), item 550) to appear as if it corresponds with another dataset (e.g., dataset (m), item 560).

As one of skill in the art would understand, for example, this involves manipulation of the images in dataset (s) down to the pixel level thereby smoothing the synthetically generated pixels to appear as if they have the features, values, attributes and/or characteristics of the pixels of images in dataset (m). This, therefore, provides that Step 406's execution of the CycleGAN software results in Step 408's modification (or transformation) of the synthetic image set (s) based on attributes of the real image set (s). This results in the generation of a modified synthetic dataset (Step 410) that can be utilized for classifying images of a live steam, as discussed in relation to FIG. 4B below.

According to some alternative embodiments, the training of the element classifier module 306 of the video intelligence engine 300 can involve leveraging user input in selecting the quality of trained models. For example, with a multitude of classifier versions, each can be trained on different realizations of a synthetic dataset (e.g., using different fonts, colors, rotations, noise levels, and the like), where user operators inspect the quality of the results to decide which classifier is producing the most "real" or "consistent" results. In such embodiments, the synthetic data here does not need to be transformed into realistic images. Leveraging the understanding that some synthetic data may be of high quality (e.g., without a need for transformation), transformation may not be required as the synthetic data appears as real data, and the user operator (or editor) can decide that such results are satisfactory. Such embodiments, compared to the CycleGAN embodiment discussed above, do involve minimal human effort on model selection and results review; however, there is no annotation (as in conventional systems), and an algorithmic image transformation is not required (e.g., thereby evidencing a reducing in the reliance on system resources).

Turning to FIG. 4B, Process 450 details the steps of applying the trained video intelligence engine 300 to a live-stream video broadcast in real-time. According to some embodiments, Steps 452-454 of Process 450 are performed by the frame splitter module 302 of the video intelligence engine 300; Steps 456-458 are performed by the detector module 304; Steps 460-462 are performed by the element classifier module 306; and Steps 464-466 are performed by the player identification module 308.

Process 450 begins with Step 452 where a live stream of a media file is received for display within a user interface (UI). According to some embodiments, the live stream can be an HLS stream, and in some embodiments, the stream can be any type of downloadable or renderable media file, as discussed above. The UI may be associated with an application executing on a user's device, or within a browser, or any other type of known or to be known mechanism for rendering a live stream video. It should be understood that the content of the streaming video can be associated with any type of content, and the functionality of the instant application will remain applicable.

According to some embodiments, Step 452 can involve parsing the live stream and identifying data contained therein or data that points to other data that indicates which two teams are playing, and further includes the player information for each team. In some embodiments, header information of the initially received stream can provide such data. In some embodiments, the identification of which teams and players are in the game can be identified from the request for receiving the live stream. In some embodiments, a separate request can be provided that can result in the identification of the team and player information, which can occur prior to or after the initial frames are received. For example, a request can be sent to the NFL.com website that results in the scraping of team and player information that can be utilized in Process 450, as discussed herein. The received, retrieved or otherwise identified team and player information can be stored in database 320.

In Step 454, in order to process the video stream, the video intelligence engine 300 receives the stream segments and then identifies within them individual frame sets, where each frame set (which can include 1-n frames) represents a scene of the live stream. In some embodiments, for example, if the live stream is in the form of HLS, the stream can be decoded by the engine 300 then analyzed accordingly, as discussed herein; and in some embodiments, HLS segments can be analyzed by engine 300 prior to decoding occurring. According to embodiments of the instant disclosure, the frame splitter module 302 utilizes canonical Fast Forward MPEG (FFMPEG) software which transforms the live stream data into such frame sets, which can include an array of RGB images referencing a specific scene of the stream. One of skill in the art would understand that such usage of FFMPEG, or any other type of command line application for converting video/audio codecs, is more efficient and saves computational resources as compared against the traditional parsing and storing of JPEGs in order to encode the copious number of frames of the stream.

In Step 456, each frame set is parsed and analyzed, and when a jersey number is detected within a respective frame of a frame set, a location within the frame(s) is identified. Thus, in Step 456 the location of a jersey within the stream (e.g., which frames, which time within the stream, where within each frame, and the like) is identified, and such identification occurs without actually determining which number is depicted (i.e., where the number is, not what the number is).

In some embodiments, Step 456 involves applying a bounding box to the frames having detected jersey numbers (e.g., as illustrated in FIG. 5A—item 504), which provides the location of the detected jersey number for the subsequent steps performed by the video intelligence engine 300. According to some embodiments, Step 456 can be performed by any known or to be known visual object detection mechanism, algorithm or technology, including, for example, a Deformable Parts Model, Single Shot Detector (SSD), You Only Look Once (YOLO) Detector, and the like.

In Step 458, an image patch is created for each frame set. Step 458 involves creating the image patch by cropping the image frames with detected jersey numbers based on the applied bounding boxes. Such creation can be performed by any known or to be known computer vision and image processing technology or algorithm, including, for example, feature extraction. In some embodiments, a created image patch is embodied as a created image file including only content depicted within a bounding box.

According to some embodiments, in order to create an optimal user experience, it may save computer resources to not analyze every detected jersey found on the screen. For example, when the camera pans to the sidelines, dozens of players could potentially be queued for analysis (or even added to the metadata sidebar (e.g., UI portions 506 and 508, as in FIG. 5A) and flood it, as discussed below), making it more difficult for the system to discern the proper jersey numbers to analyze, and almost impossible for the user to digest any information should all detected jerseys be subject to the disclosed processing.

Therefore, in some embodiments, only jersey numbers that appear in a predetermined number of sequential frames may be subject to the processing discussed herein. For example, only a jersey being detected in a number of sequential frames amounting to a 3 or 5 or 10 second scene, or appearing against a green background rather than a crowded sideline, would trigger the image patch creation of Step 458.

In another example, players can be uniquely identified by their team and number. For example, BAL10 and MIA10 identify player number "ten" on Baltimore's team and player number "10" on Miami's team. If BAL10 appears in frame K, and again later in frame K+G, where G is less than an occurrence threshold and not the next frame after K, then it can be determined that the player was on screen between K and K+G, and the jersey number was occluded or blurry between the two detections. In such embodiments, for the purposes of drawing bounding boxes, these two detections can be linearly interpolated then have a smoothing algorithm applied. Alternatively, this analysis can result in the deletion of these two frames when i) the detections did not satisfy the aforementioned occurrence threshold, and/or ii) they were not sequential (and do not satisfy the threshold). Thus, for example, if a detection appears in a single frame, or a very small number of sequential frames, then at least one of two things are true: (1) the detection is a misclassification or (2) the appearance is too short to be of any consequence to a human observer and should be discarded.

Turning back to FIG. 4B, Process 450 then proceeds to Step 460 where the trained classifier 306 of the video intelligence engine 300 (from Process 400 discussed above) is applied to the created image patches from Step 458. Execution (or application) of the classifier 306 in Step 460 results in Step 462—the categorization of each image patch into one of 100 categories (i.e., 0-99, which represents for this exemplary embodiment all possible numbers on jerseys)—that is, the determination of which number is depicted, and the identification of the color of the number depicted. The number and color of a jersey number are then utilized as a query to the previously obtained team and player information (from Step 452 above, which can be stored in database 320), and the identification of which player on which team is depicted is performed. Step 464.

By way of a non-limiting example, as illustrated in FIG. 5A, a game between Buffalo and Jacksonville is being live streamed within UI 502. Jersey number 50 is detected as currently being displayed, and after the analysis performed by Steps 452-464, it is determined that the number belongs to player "Tevin Smith" of the "Jacksonville Jaguars." As discussed below, information relating to "Tevin Smith" can be retrieved and displayed within UI portion 506. For example, UI portion 506 can display stats for "Tevin Smith" for the season, or even for that particular game. UI portion 508 displays previously detected players, such that the most currently detected jersey number is displayed in portion 506 and is moved to portion 508 when a subsequent detection is made. In some embodiments, there may be more portions, and the interface between portions 506-508 or 506—portion n may be scrollable so that a user can interact with the UI to scroll between detected players. In some embodiments, UI portion 506 or 508 can display third party content as discussed below in relation to FIG. 6.

Continuing with Process 450, Step 466 involves the automatic retrieval and display of the corresponding metadata related to the determined player in a portion of the UI, as discussed above and illustrated in example embodiment depicted in FIG. 5A.

According to some embodiments, identification of the corresponding metadata of an identified player can involve implementing an n-way color classifier, where n is the number of colors known to exist in a given sports genre. Once the color of a jersey is identified (as in Step 462), the number and color can be mapped to either one of the teams in a given game video. Therefore, once the team is known, a search of a database of player/roster information (e.g., if locally stored in database 320 or a third party database—for example, NFL.com) can be performed resulting in specific player information retrieval.

Therefore, Process 450 is performed for each live streamed video, and is capable of determining which player is currently being displayed on a screen in real-time, and is further capable of providing augmenting digital content to that real-time detected player. Thus, as depicted in FIG. 5A, when a player is depicted within a UI, his jersey is automatically detected, processed and identified (as per the above steps of Process 450), and augmenting information (e.g., the corresponding metadata of the player as discussed above) is automatically displayed within the UI.

FIG. 6 is a work flow example 600 for serving related digital media content associated with or comprising advertisements (e.g., digital advertisement content) based on the information associated with streaming video, as discussed above in relation to FIGS. 3-5B. Such information, referred to as "object information" for reference purposes only, can include, but is not limited to, information associated with a player detected in the video stream, information associated with at least one of the teams playing in the game, the context of the video stream, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/ or capabilities. Therefore, while the content is referred as an advertisement, it is still a digital media item that is renderable by a computing device, and such digital media item comprises digital content relaying promotional content provided by a network associated third party.

In Step 602, object information is identified. As discussed above, the object information can be based any of the information from processes outlined above with respect to FIGS. 3-5B. For purposes of this disclosure, Process 600 will refer to single video stream as the basis for serving a digital advertisement(s); however, it should not be construed as limiting, as any number of streams, as well as programs used and/or content items included therein can form such basis, without departing from the scope of the instant disclosure.

In Step 604, a context is determined based on the identified object information. This context forms a basis for serving advertisements related to the object information. In some embodiments, the context can be in accordance with the context of the real-time video stream, as discussed above in relation to FIGS. 4A-4B. For example, a stream can include content depicting a game involving the New York Football Giants®; therefore, the context identified in Step 604 can be related to "Football" or, more specifically, Giants® related information, and can be leveraged in order to identify digital ad content related to such activities (e.g., offers for team related merchandise, season tickets and the like), as discussed herein in relation to the steps of Process 600. In some embodiments, the identification of the context from Step 604 can occur before, during and/or after the analysis detailed above with respect to Process 450, or it can be a separate process altogether, or some combination thereof.

In Step 606, the determined context is communicated (or shared) with an advertisement platform comprising an advertisement server 130 and ad database. Upon receipt of the context, the advertisement server 130 performs (e.g., is caused to perform as per instructions received from the device executing the video intelligence engine 300) a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to view, render and/or interact with the streaming media. Step 612. In some embodiments, the selected advertisement is sent directly to a user computing device, and can be displayed as part of or in a similar manner of item 506 (from FIG. 5A). In some embodiments, the selected advertisement is displayed within a portion of the interface or within an overlaying or pop-up interface associated with the rendering interface used to stream the video.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, at a computing device, a streaming media file comprising a plurality of frames of content to be displayed within a first portion of a user interface (UI) displayed on a display of the computing device;

analyzing, via the computing device, the content of the received frames of the streaming media file, and based on said analysis, determining a first frame depicting a first element, said determination comprising identifying a display location of the first element within the first frame;

identifying, via the computing device, based on said determination, an image portion of the first frame, said identified image portion comprising a portion of the content within the first frame that corresponds to the display location of the first element within the first frame;

executing, via the computing device, image classifier software on the image portion, said execution comprising analyzing attributes of the image portion and performing image classification of the image portion based on a synthetic training image dataset, and based on said analysis and classification, determining information indicating an identity and type of the first element;

retrieving, via the computing device, augmenting information to the streaming media file that corresponds to the first element based on said determined information of the first element; and displaying, via the computing device, said augmenting information within a separate second portion of the UI while said first frame is displayed within said first portion of the UI, the second portion being distinct and separate from the first portion.

2. The method of claim 1, wherein said identification of the image portion comprises:

creating an image patch, said creation comprising cropping the first frame such that each image patch comprises only the content depicted within a portion of said first frame.

3. The method of claim 2, further comprising:

applying a bounding box to the first frame in accordance with said display location of the first element, wherein said cropping is based upon said application of the bounding box.

4. The method of claim 2, wherein said creation of said image patch is executed by the computing device executing feature extraction software on the first frame.

5. The method of claim 1, further comprising:
analyzing the received streaming media file, and based on said analysis, identifying a frame set that corresponds to a particular scene, said determination of said first element corresponds to identification of a display location within each frame in said frame set.

6. The method of claim 5, wherein said identification of the frame set is based on the computing device executing Fast Forward MPEG (FFMPEG) software on said streaming media file.

7. The method of claim 1, further comprising:
determining, based on said analysis of said content of the received frames, a number of sequential frames in which the first element appears;
determining whether said number of sequential frames satisfies an occurrence threshold; and
discarding a segment of the media file when said threshold determination is not satisfactory prior to identification of an associated image portion.

8. The method of claim 1, wherein said image classifier software comprises a trained network model, wherein training of the model comprises:
generating a synthetic dataset of images depicting specific content elements;
identifying a real image dataset depicting said specific content elements;
executing data manipulation software on both image sets, said executing causing attributes of each image in the synthetic dataset to be modified to correspond to attributes of the real image dataset; and
generating the synthetic training image dataset based on said data manipulation software execution, said training image dataset forming a definition within said image classifier software.

9. The method of claim 8, wherein said trained network model is a Convolutional Neural Network (CNN).

10. The method of claim 1, wherein said first element corresponds to a depiction of a jersey number within said first frame, wherein said identity corresponds to a specific jersey number, wherein said type corresponds to attributes of said jersey number and a jersey upon which it is displayed.

11. The method of claim 10, wherein said attributes of the jersey and jersey number comprise characteristics selected from a group consisting of: fonts, shapes, colors, shades, lighting values, display angles and wrinkles.

12. The method of claim 1, wherein said streaming media file is associated with a live broadcast of an event.

13. A non-transitory computer-readable storage medium tangibly encoded with computer-executable instructions, that when executed by a processor associated with a computing device, performs a method comprising:
receiving, at the computing device, a streaming media file comprising a plurality of frames of content to be displayed within a first portion of a user interface (UI) displayed on a display of the computing device;
analyzing, via the computing device, the content of the received frames of the streaming media file, and based on said analysis, determining a first frame depicting a first element, said determination comprising identifying a display location of the first element within the first frame;
identifying, via the computing device, based on said determination, an image portion of the first frame, said identified image portion comprising a portion of the content within the first frame that corresponds to the display location of the first element within the first frame;
executing, via the computing device, image classifier software on the image portion, said execution comprising analyzing attributes of the image portion and performing image classification of the image portion based on a synthetic training image dataset, and based on said analysis and classification, determining information indicating an identity and type of the first element;
retrieving, via the computing device, augmenting information to the streaming media file that corresponds to the first element based on said determined information of the first element; and
displaying, via the computing device, said augmenting information within a separate second portion of the UI while said first frame is displayed within said first portion of the UI, the second portion being distinct and separate from the first portion.

14. The non-transitory computer-readable storage medium of claim 13, wherein said identification of the image portion comprises:
creating an image patch, said creation comprising cropping the first frame such that each image patch comprises only the content depicted within a portion of said first frame.

15. The non-transitory computer-readable storage medium of claim 14, further comprising:
applying a bounding box to the first frame in accordance with said display location of the first element, wherein said cropping is based upon said application of the bounding box.

16. The non-transitory computer-readable storage medium of claim 13, further comprising:
analyzing the received streaming media file, and based on said analysis, identifying a frame set that corresponds to a particular scene, said determination of said first element corresponds to identification of a display location within each frame in said frame set.

17. The non-transitory computer-readable storage medium of claim 13, further comprising:
determining, based on said analysis of said content of the received frames, a number of sequential frames in which the first element appears;
determining whether said number of sequential frames satisfies an occurrence threshold; and
discarding a segment of the media file when said threshold determination is not satisfactory prior to identification of an associated image portion.

18. The non-transitory computer-readable storage medium of claim 13, wherein said image classifier software comprises a trained network model, wherein training of the model comprises:
generating a synthetic dataset of images depicting specific content elements;
identifying a real image dataset depicting said specific content elements;
executing data manipulation software on both image sets, said executing causing attributes of each image in the synthetic dataset to be modified to correspond to attributes of the real image dataset; and
generating the synthetic training image dataset based on said data manipulation software execution, said training image dataset forming a definition within said image classifier software.

19. The non-transitory computer-readable storage medium of claim 13, wherein said first element corresponds to a depiction of a jersey number within said first frame, wherein said identity corresponds to a specific jersey number, wherein said type corresponds to attributes of said jersey number and a jersey upon which it is displayed.

20. A computing device comprising:
   a processor; and
   a non-transitory computer-readable storage medium for tangibly storing thereon program logic for execution by the processor, the program logic comprising:
   logic executed by the processor for receiving, at the computing device, a streaming media file comprising a plurality of frames of content to be displayed within a first portion of a user interface (UI) displayed on a display of the computing device;
   logic executed by the processor for analyzing, via the computing device, the content of the received frames of the streaming media file, and based on said analysis, determining a first frame depicting a first element, said determination comprising identifying a display location of the first element within the first frame;
   logic executed by the processor for identifying, via the computing device, based on said determination, an image portion of the first frame, said identified image portion comprising a portion of the content within the first frame that corresponds to the display location of the first element within the first frame;
   logic executed by the processor for executing, via the computing device, image classifier software on the image portion, said execution comprising analyzing attributes of the image portion and performing image classification of the image portion based on a synthetic training image dataset, and based on said analysis and classification, determining information indicating an identity and type of the first element;
   logic executed by the processor for retrieving, via the computing device, augmenting information to the streaming media file that corresponds to the first element based on said determined information of the first element; and
   logic executed by the processor for displaying, via the computing device, said augmenting information within a separate second portion of the UI while said first frame is displayed within said first portion of the UI, the second portion being distinct and separate from the first portion.

* * * * *